3,264,062
ALUMINA PRODUCT AND ITS METHOD
OF PREPARATION
William L. Kehl, Indiana Township, Allegheny County, and Meredith M. Stewart, Penn Hills Township, Allegheny County, Pa., assignors to Gulf Research & Development Company, Pittsburgh, Pa., a corporation of Delaware
Filed Dec. 21, 1962, Ser. No. 246,460
11 Claims. (Cl. 23—141)

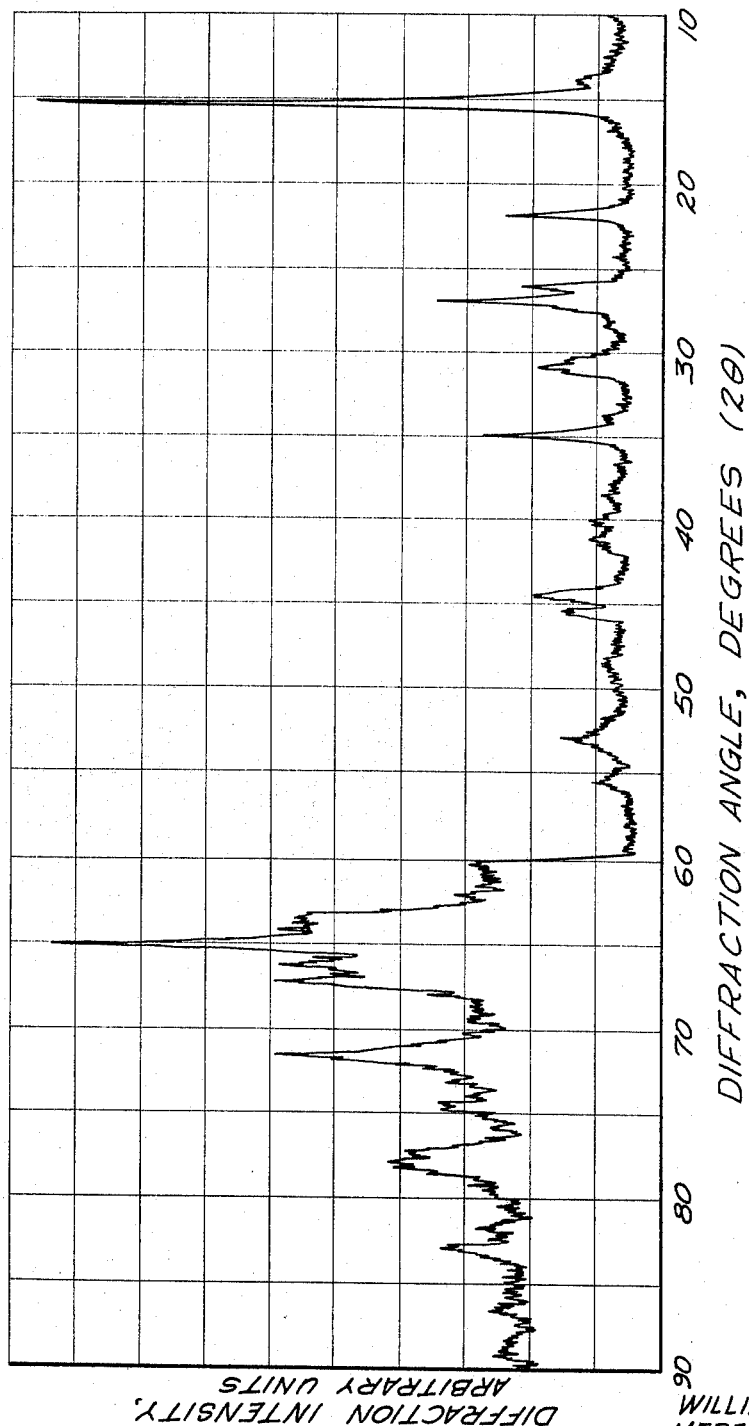

This invention relates to a novel alumina hydrate and to the method for its preparation.

In accordance with this invention a novel alumina hydrate having the approximate formula $$Al_2O_3 \cdot 1.2-2.6H_2O$$

is precipitated by adding aqueous aluminum salt solution to an aqueous solution of ammonium bicarbonate. The aluminum salt solution is substantially free of metals other than aluminum and the ammonium bicarbonate solution is substantially free of metals, especially alkali metals such as sodium and potassium. The ammonium bicarbonate serves not only as a precipitant but also as a buffer solution and is therefore present in the mixture in massive quantity, sufficient to maintain the pH of the mixture within the range 7 to 9 throughout substantially the entire mixing operation. Upon addition of the solution containing aluminum ions to the ammonium bicarbonate solution, the pH in the admixture nearly instantaneously stabilizes in the pH range 7 to 9 where it remains for the entire remainder of the precipitation and a crystalline aluminum hydroxide precipitates which is an intermediate hydrate of high purity having the approximate formula $Al_2O_3 \cdot 1.2-2.6H_2O$.

Although a wide variety of substances exist which are capable of serving the function of precipitant and buffer, we have discovered that by employing ammonium bicarbonate as precipitant and buffer a novel alumina hydrate is produced nearly all of which is crystalline but which has a small amorphous portion which can comprise from 5 to 20 percent by weight of the hydrate. Ammonium bicarbonate is the only precipitant and buffer which produces the novel alumina hydrate of this invention.

Although the alumina hydrate of this invention commonly contains about 2.4 moles of water per mole of alumina it is not similar in structure to the known alumina hydrates possessing this amount of water of hydration. While alumina monohydrate is known as boehmite and alumina trihydrates are known as bayerite, gibbsite and nordstrandite, hydrates containing more water of hydration than boehmite but less water of hydration than bayerite, gibbsite and nordstrandite are generally known as pseudoboehmite. However, the alumina hydrate of this invention does not exhibit the X-ray diffraction pattern nor other physical characteristics of the hydrates commonly known as pseudoboehmite.

The crystalline portion of the alumina hydrate of this invention was studied for its X-ray diffraction qualities, the amorphous portion of the sample also being present but acting only as a diluent in the diffraction study and not interfering with the X-ray diffraction pattern of the crystalline portion. The X-ray diffraction study showed that the crystalline portion of the alumina hydrate is comprised of adjacent molecules arranged three dimensionally as a lattice to form individual or cellular crystalline units, known as unit cells. Each individual unit cell is comprised of about eight molecules of $Al_2O_3 \cdot xH_2O$ ($1<x<3$), as determined by X-ray diffraction. The basic crystal structure having all the characteristics of a large mass of the crystalline material is formed in a single one of these unit cells and the entire crystalline portion of the material is comprised of a large number of repeating, identical unit cells, each having about eight molecules of $Al_2O_3 \cdot xH_2O$ ($1<x<3$). As determined by X-ray diffraction, each unit cell of the alumina hydrate product of the bicarbonate precipitation is approximately cubic in configuration, being three dimensional and having all three axes at right angles to each other, with each of the three lateral axes being of nearly equal length and measuring about 8.2 A. on edge. While X-ray diffraction tests indicate that the three lateral axes of the alumina hydrate crystal product of the bicarbonate precipitation are not exactly equal to each other in length, they are sufficiently nearly equal in length so that the crystal structure more closely approximates a cube than the crystals of other known alumina hydrates since crystals of other known alumina hydrates are definitely tetragonal or orthorhombic in configuration. An approximately cubic crystalline configuration is unique among known alumina hydrate crystals. It is unlike the crystalline configuration of the hydrates produced with precipitants and buffers other than ammonium bicarbonate wherein adjacent molecules tend to be arranged as a lattice forming unit cells which do not in any way approximate a cube but are definitely tetragonal or orthorhombic in configuration, as determined by X-ray diffraction. For example, as reported in the literature, the unit cell boehmite has axial dimensions of 2.86 A., 12.23 A. and 3.69 A. while the unit cell for bayerite has axial dimensions of 5.02 A., 8.69 A. and 4.77 A. In contrast, each of the axes of the unit cell of the alumina hydrate product of the bicarbonate precipitation measures sufficiently close to 8.2 A. that the crystalline structure is basically cubic.

The crystalline alumina hydrate of this invention is further distinguished from other alumina hydrates by its dehydration behavior. Dehydration tests were made upon an alumina hydrate of this invention in which the cubic crystalline phase predominated and which also contained a fraction amorphous to X-rays. Separate samples of this hydrate were calcined at temperatures of 400°, 575°, 750°, 900°, 1000° and 1400° F., respectively, and then analyzed by X-ray diffraction. While most of the water of hydration is lost by heating to only 400° F., and essentially all of it is removed by heating to 750° F., it is necessary to calcine the material at a temperature of 1400° F. in order to produce the same degree of structural ordering, as determined by X-ray diffraction, that is obtained by calcining bayerite at approximately 600° F. or boehmite and the pseudoboehmites at approximately 1000° F.

In dehydration of the alumina hydrate prepared according to the method of this invention, which predominates in the cubic crystalline alumina hydrate and contains some amorphous alumina hydrate, the temperature of dehydration has a significant effect upon the structure of the product. Calcination at 400° F. causes the cubic crystalline phase to be transformed to an amorphous phase. Some signs of ordering begin to reappear, as evidenced by X-ray diffraction, at a calcination temperature of 575° F., and this ordering is more apparent after calcination at 750° F. The sample remained at each test temperature until substantial equilibrium was achieved. Although structural ordering continues to improve with increasing temperature, at 900° F. the structure is still quite disordered. It is not until after calcination at 1400° F. that an X-ray diffraction pattern appears which is similar to that of other alumina anhydrides such as eta alumina and gamma alumina. While the various alumina anhydrides, such as eta alumina and gamma alumina, are evidently structurally distinct from each other because they are derived from distinct alumina hydrate precursors, such as bayerite, nordstrandite, boehmite and the pseudo-boehmites, nevertheless these anhydrides themselves are not readily distinguishable one from the other by means of their respective X-ray diffraction patterns. The same situation prevails with respect to the calcination product of the alumina hydrate of this invention. Its X-ray diffraction pattern upon calcination at 1400° F. until substantial equilibrium is achieved is similar to that produced by other activated aluminas, but its molecular structure after calcination is evidently different from the structure of other activated aluminas because it comes from a precursor hydrate which is structurally different from the precursors of other activated aluminas.

The alumina hydrate of this invention possesses the unusual characteristic of chemically rehydrating to a different crystalline form upon subsequent contact with liquid water if it is first heated to a temperature at least about 350° F. to 400° F. but not higher than 1400° F. This rehydration phenomena is explained in a separate application Serial Number 246,331 filed on the same date as this application by William L. Kehl and Meredith M. Stewart. If the novel alumina hydrate is not subsequently to be contacted with water during use it can be calcined at a conventional calcination temperature in the range 750° F. to 1500° F., but if it is to be subsequently contacted with water during use it should be calcined at a temperature of at least 1400° F. to prevent on-stream rehydration.

The novel alumina hydrate of this invention whose major constituent is crystalline and possesses a cubic crystal lattice is prepared by adding the aqueous aluminum salt solution to the aqueous ammonium bicarbonate solution slowly, preferably intermittently, with stirring and with sufficient care to substantially avoid even temporary localized zones in the mixture having a pH outside the range 7 to 9. The ammonium bicarbonate is present in sufficient quantity to act as a buffer. Within this pH range carbon dioxide freely evolves during the precipitation and the reaction proceeds according to the equation:

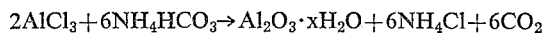
$$2AlCl_3 + 6NH_4HCO_3 \rightarrow Al_2O_3 \cdot xH_2O + 6NH_4Cl + 6CO_2$$

It is important that the pH be maintained in the range 7 to 9 throughout the precipitation and that a pH below 7 or above 9 substantially avoided during the procedure. At a pH below 7 and at a pH above 9 other alumina hydrates are obtained. For example, a conventional method for the preparation of an alumina hydrate is by adding aqueous ammonium hydroxide solution to aqueous aluminum chloride solution. Before any hydroxide is added to the aluminum chloride solution the pH of this latter solution is about 2.3. The addition of ammonium hydroxide to the aluminum chloride solution causes its pH to increase and within the pH range 3 to 4.5 nonfilterable but non-ionic colloidal sol forms having the formula $Al(OH)_xCl_y$, where $x+y=3$. With continued addition of ammonium hydroxide, the dispersed non-ionized sol sets to a gel upon attaining a pH of about 5 to 5.5. Upon the formation of the gel the solution sets to such a high consistency that effective stirring is no longer possible. The product of this method is a varying mixture of alumina hydrates including substantial quantities of bayerite, amorphous alumina and other hydrate forms such as gibbsite and nordstrandite.

The formation of a sol and a gel in the preparation of alumina hydrate can be avoided by mixing the aqueous aluminum chloride solution and the aqueous ammonium hydroxide at pH values solely in the basic range. This can be accomplished by adding small increments of aqueous aluminum chloride solution accompanied by thorough mixing to aqueous ammonium hydroxide. With sufficiently small increments of aluminum chloride solution added sufficiently slowly and with adequate agitation, localized zones of pH below 7 are substantially completely avoided. Reaction in this manner results in a mixed solution having pH values between about 12 and 7 and within this range a crystalline alumina precipitate is formed.

When forming a crystalline precipitate in this manner it is important that the aqueous solution of aluminum salt be added incrementally with sufficient care and slowness so that even temporary, localized zones of pH below 7 are avoided since such acidic localized zones not only reduce the purity of the crystalline precipitate being formed by inducing sol and gel formation but also peptize crystalline precipitate already formed converting it into an amorphous gel form. Once exposed to a pH below 7 crystalline alumina hydrate is irreversibly converted to an amorphous form and cannot subsequently be reconverted to the crystalline form by increasing the pH.

When the initial increments of aqueous solution of aluminum ions are added to aqueous ammonium hydroxide, the pH of the mixed solution starts to drop from a value of about 12. Within the pH range 12 to 9, the alumina hydrate precipitated is the intermediate hydrate form having the approximate formula $Al_2O_3 \cdot 1.2-2.6H_2O$ which, only minutes after formation, starts to hydrate to the trihydrate form. If the mixing operation occurs at room temperature, or even at temperatures up to 170° F. to 180° F., this transformation of the intermediate hydrate to trihydrate proceeds rapidly. With further addition of aqueous aluminum chloride solution to the aqueous ammonium hydroxide, the pH continues to fall until the pH range 9 to 7 is reached. Within the pH range 9 to 7 the alumina hydrate precipitate formed is also the intermediate hydrate but within this lower pH range the hydration to trihydrate proceeds at a much slower rate. However, the ordinarily slow transformation of intermediate hydrate to trihydrate within the pH range 9 to 7 is catalyzed by any trace quantities of tryihydrate which are present, for example, trihydrate previously formed within the pH range 12 to 9.

It is an important advantage of this invention that precipitation at a pH above 9 is substantially avoided and therefore formation of trace quantities of bayerite is also avoided. In accordance with the present invention, although the pH of the ammonium bicarbonate solution prior to the addition of aluminum salt solution may be about 10, the pH falls to the range 7 to 9 almost instantaneously upon the addition of the first drop of aluminum salt solution and if there is sufficient ammonium bicarbonate present the pH remains within the range 7 to 9 throughout the operation. In this manner precipitation of trace quantities of bayerite is substantially avoided. The reason that addition of acid aluminum salt to bicarbonate solution having a pH above 9 results in instantaneous reduction of the pH to a value below 9 is that a bicarbonate solution having a pH above 9 necessarily contains very few hydroxyl ions because at a pH above 9 bicarbonate ion reacts with hydroxyl ion removing the hydroxyl ion from the solution according to the equation:

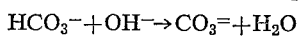
$$HCO_3^- + OH^- \rightarrow CO_3^= + H_2O$$

The ammonium bicarbonate employed must be free of other alkaline precipitants and it is especially important that bicarbonates of alkali metals, such as sodium and potassium bicarbonate, not be utilized as precipitants together with ammonium bicarbonate in the practice of this invention. These metals interfere with the production of the alumina hydrate precipitate of this invention. It appears the presence of metallic impurities such as sodium catalyzes dehydration of alumina hydrates having more than one mole of water per mole of aluminum to the monohydrate, known as boehmite. Furthermore, in contrast to volatile ammonia, these metals remain as impurities in the hydrate which is formed, even after prolonged washings, and tend to reduce the catalytic activity of the final product. On the other hand, ammonia, being volatile, is completely vaporized during the drying operation. A further disadvantage in the use of sodium or potassium bicarbonate is that even trace quantities of these metals drastically inhibit the ability of a catalyst containing dehydrated alumina to undergo reactivation by the common means of burning carbonaceous impurities from the catalyst surface since these metals have low melting points and act as fluxes, tending to sinter active catalytic sites during high temperature catalyst reactivation.

A variety of aqueous solutions of aluminm salts can be employed including aqueous solutions of aluminum chloride and aluminum nitrate. Aqueous solutions of other soluble acidic aluminum salts such as soluble aluminum salts of carboxylic acids such as aluminum formate or aluminum propionate can be employed. Aqueous aluminum sulfate solution is not desirable since alumina hydrate formed in the presence of sulfate ion contains significant amounts of basic aluminum sulfates. Furthermore, it is difficult to adequately remove sulfate from the product even by protracted washings. The molality of the aluminum salt solution is not critical and can range between 0.1 and 4.0 molality. Dilute solutions of not more than 1 or 2 molality are preferred.

The cubic crystalline alumina hydrate produced by the method of this invention is very light and upon calcination yields an alumina anhydride having a well developed pore structure with a large surface area, a large pore volume and a high average pore radius. The high porosity of these aluminas results in a very low bulk density. Measured in the granular form after calcination, the bulk density ranges from 0.25 to 0.45 gram per milliliter. This is only about half as dense as most catalytic aluminas. The heavier particles within this density range are hard and strong and give the material sufficient mechanical strength for use as catalyst supports. The bulk density and physical strength of the alumina granules appear to be influenced by the presence of the minor amount of amorphous alumina hydrate together with the cubic crystalline alumina hydrate.

EXAMPLE 1

1000 milliliters of $NH_4OH$ (28 percent $NH_3$) were mixed with 2000 milliliters of $H_2O$ and the solution was saturated with carbon dioxide gas to produce a solution of ammonium bicarbonate substantially free of carbonate. The pH of the saturated solution was 10.1

1000 grams of $AlCl_3 \cdot 6H_2O$ were dissolved in 5000 milliliters of $H_2O$ and the solution was added to the ammonium bicarbonate solution in a slow stream with constant stirring until a pH of 8.0 was obtained. Almost instantaneously upon addition of $AlCl_3$ solution, the pH in the bicarbonate solution dropped below 9.

The precipitate was filtered and washed with water containing 1 gram of ammonium bicarbonate per liter. The filter cake was dried at 250° F. for 22 hours and then calcined at 900° F. for 16 hours. The results of nitrogen adsorption measurements are shown in Table 1.

EXAMPLE 2

1000 milliliters of $NH_4OH$ (28 percent $NH_3$) were mixed with 2000 milliliters of $H_2O$ and the solution was saturated with carbon dioxide gas to produce a solution of ammonium bicarbonate substantially free of carbonate. The pH of the saturated solution was 9.8.

1000 grams of $AlCl_3 \cdot 6H_2O$ were dissolved in 5000 milliliters of $H_2O$ and this solution was added to the ammonium bicarbonate solution in a slow stream with constant stirring until a pH of 8.1 was obtained. Almost instantaneously upon addition of $AlCl_3$ solution, the pH in the bicarbonate solution dropped below 9.

The precipitate was filtered and washed with water containing 1 gram of ammonium bicarbonate per liter. The filter cake was dried at 250° F. for 16 hours and then calcined at 900° F. for 16 hours. The results of nitrogen adsorption measurements are shown in Table 1.

EXAMPLE 3

2000 milliliters of $NH_4OH$ (28 percent $NH_3$) were mixed with 4000 milliliters of $H_2O$ and the solution was saturated with carbon dioxide gas to produce a solution of ammonium bicarbonate substantially free of carbonate. The pH of the saturated solution was 9.7.

2000 grams of $AlCl_3 \cdot 6H_2O$ were dissolved in 10 liters of $H_2O$ and this solution was added to the ammonium bicarbonate solution in a slow stream with constant stirring until a pH of 8.0 was obtained. Almost instantaneously upon addition of $AlCl_3$ solution, the pH in the bicarbonate solution dropped below 9.

The precipitate was filtered and washed with water containing 1 gram of ammonium bicarbonate per liter. The filter cake was dried at 250° F. for 16 hours and then calcined at 900° F. for 16 hours. The results of nitrogen adsorption tests are shown in Table 1.

EXAMPLE 4

2000 milliliters of $NH_4OH$ (28 percent $NH_3$) were mixed with 4000 milliliters of $H_2O$ and this solution was saturated with carbon dioxide gas to produce a solution of ammonium bicarbonate substantially free of carbonate. The pH of the saturated solution was 9.2.

2000 grams of $AlCl_3 \cdot 6H_2O$ were dissolved in 10 liters of $H_2O$ and this solution was added to the ammonium bicarbonate solution in a slow stream with constant stirring until a pH of 8.1 was obtained. Almost instantaneously upon addition of $AlCl_3$ solution, the pH in the bicarbonate solution dropped below 9.

This precipitate was washed by decantation with water containing 5 milliliters of ammonium bicarbonate solution per liter. The ammonium bicarbonate wash solution was prepared according to the procedure outlined at the beginning of this example. The precipitate was dried at 250° F. for 16 hours and then calcined at 900° F. for 16 hours. The results of nitrogen adsorption tests are shown in Table 1.

EXAMPLE 5

A first solution was prepared by dissolving 2000 grams of $AlCl_3 \cdot 6H_2O$ in 10 liters of water. A second solution was prepared by mixing 2000 milliliters of concentrated $NH_4OH$ solution (28 percent $NH_3$) with 5 liters of water and $CO_2$ gas was then passed through the resulting solution until the solution pH was 9.35.

A third solution was then prepared by adding 10 grams of $NH_4Cl$ to 5 liters of water. Thereupon, a slow stream of the first solution and a slow stream of the second solution were added to the third solution with constant mixing. The rates of addition were adjusted to maintain the pH of the mixture between 8 and 9 while alumina was being precipitated.

The slurry was filtered and the precipitate was washed with a solution containing 5 milliliters of the second solution per liter of water. Washing was discontinued when the conductivity of the wash solution reached a constant level. The precipitate was dried at 250° F. for 16 hours and then calcined at 900° F. for 16 hours. The results of nitrogen adsorption tests made on the calcined sample are shown in Table 1. A portion of the precipitate which was dried but not calcined was subjected to X-ray diffraction tests and the X-ray diffraction pattern is shown in the figure. In observing the diffraction chart shown in the figure it is noted that at about a diffraction angle of 60 degrees the power input to the diffractometer was increased about five-fold in order to better emphasize the peaks of the pattern but that the sample under analysis was not changed. Table 2 is presented in conjunction with the figure and presents a tabulation of interplanar spacings, $d$, and the relative intensities, $I/I_0$, ($I_0=100$), of the major lines in the X-ray diffraction pattern of the figure.

*Table 1*

NITROGEN ADSORPTION DATA ON CALCINED ALUMINAS DERIVED FROM CUBIC ALUMINA HYDRATES

|  | Example 1 | Example 2 | Example 3 | Example 4 | Example 5 |
|---|---|---|---|---|---|
| Average Pore Radius, (A.) | 40 | 60 | 68 | 57 | 51 |
| Pore Volume, (ml./gm.) | 0.76 | 0.83 | 0.82 | 0.83 | 0.92 |
| Surface Area, (m.$^2$/gm.) | 362 | 327 | 285 | 404 | 384 |
| Pore Size Distribution: Percent of the Pore Volume Having the Listed Pore Radius, A.: | | | | | |
| +200 | 11.1 | 10.2 | 11.8 | 10.9 | 1.1 |
| 100-200 | 11.5 | 20.5 | 23.2 | 21.3 | 11.5 |
| 50-100 | 17.1 | 25.6 | 25.8 | 22.0 | 38.9 |
| 40-50 | 10.6 | 8.5 | 10.5 | 5.0 | 10.8 |
| 30-40 | 17.2 | 14.0 | 14.3 | 6.9 | 13.4 |
| 20-30 | 26.9 | 19.5 | 14.3 | 20.3 | 23.0 |
| 10-20 | 5.7 | 1.6 | 0.0 | 13.6 | 1.3 |
| -10 | 0.0 | 0.0 | 0.0 | 0.0 | 0.0 |

*Table 2*

| d(A.) | I/I$_0$ | d(A.) | I/I$_0$ |
|---|---|---|---|
| 6.41 | 5 | 1.996 | 10 |
| 5.94 | 1 | 1.729 | 30 |
| 5.79 | 100 | 1.657 | 10 |
| 4.07 | 30 | 1.462 | 1 |
| 3.41 | 15 | 1.432 | 10 |
| 3.30 | 60 | 1.410 | 1 |
| 2.93 | 1 | 1.392 | 1 |
| 2.89 | 30 | 1.318 | 10 |
| 2.86 | 1 | 1.271 | 1 |
| 2.65 | 2 | 1.232 | 1 |
| 2.57 | 25 | 1.223 | 2 |
| 2.25 | 5 | 1.216 | 1 |
| 2.19 | 10 | 1.176 | 1 |
| 2.04 | 35 | 1.162 | 1 |

The novel alumina of this invention has wide utility as a catalyst support. It exhibited exceptional utility as a support for platinum in a process for the reforming of hydrocarbons to produce aromatics. Reforming tests were conducted in which a platinum catalyst employing as a support a calcined alumina derived from the novel alumina hydrate of this invention was compared with a widely used commercial reforming catalyst whose support was comprised entirely of a conventional alumina. Each catalyst tested was activated with approximately the same weight percent of platinum. Each of the reforming tests was conducted with equal volumes of the respective catalysts.

Physical measurements showed that even though the catalyst samples used in the reforming tests were volumetrically equal, because of differences in density the commercial catalyst sample possessed a greater total weight, more than twice the total weight of platinum and a substantially greater surface area, in comparison to the catalyst containing the alumina of this invention. These features usually entail increased catalyst cost but they ordinarily permit a catalyst to achieve improved results. Nevertheless the reforming test results showed that the catalyst containing the alumina of this invention produced more aromatics from a naphtha charge at a given debutanized liquid yield than the same volume of the commercial catalyst. The reforming test results further showed that the catalyst containing the alumina of this invention produced a reformate product at a given debutanized liquid yield having a higher Research Octane Number than the reformate product from the same volume of commercial catalyst. Since the cost of a catalyst is determined by its weight rather than its volume, the catalyst containing the alumina of this invention achieved these improved results at a substantial savings in catalyst cost.

The use of the alumina of this invention as a support for a noble metal reforming catalyst is further described in application Serial Number 246,439, filed on the same date as this application by Jonas Dedinas, William C. Starnes and Meredith M. Stewart.

We claim:
1. A process for the precipitation of alumina hydrate comprising adding an aqueous solution of an acidic aluminum salt which is substantially free of metals other than aluminum to a substantially metal free aqueous solution of ammonium bicarbonate, maintaining the resulting mixture at a pH between 7 and 9 throughout substantially the entire procedure and substantially preventing any pH in the mixture below 7 or above 9, and precipitating alumina hydrate.

2. Claim 1 wherein said aluminum salt is aluminum chloride.

3. Claim 1 wherein said aluminum salt is aluminum nitrate.

4. Claim 1 wherein said aluminum salt is a salt of a carboxylic acid.

5. Claim 1 wherein the aqueous solution of acidic aluminum salt is added to the aqueous solution of ammonium bicarbonate intermittently, with stirring, substantially avoiding even temporary, localized zones in the mixture having a pH below 7.

6. A process for the preparation of alumina comprising adding an aqueous solution of an acidic aluminum salt which is substantially free of metals other than aluminum to a substantially metal free aqueous solution of ammonium bicarbonate, maintaining the resulting mixture at a pH between 7 and 9 throughout substantially the entire procedure and substantially preventing any pH in the mixture below 7 or above 9, precipitating alumina hydrate, and calcining said hydrate at a calcination temperature between 750° F. and 1500° F.

7. Claim 6 wherein said calcination temperature is at least 1400° F.

8. Claim 6 wherein the aqueous solution of acidic aluminum salt is added to the aqueous solution of ammonium bicarbonate intermittently, with stirring, substantially avoiding even temporary, localized zones in the mixture having a pH below 7.

9. Alumina hydrate having about 1.2 to 2.6 moles of water of hydration per mole of alumina and the approximate crystalline configuration as determined by X-ray diffraction of a cube 8.2 A. on edge.

10. Alumina prepared by calcining at a temperature between 750° F. and 1500° F. an alumina hydrate having about 1.2 to 2.6 moles of water of hydration per mole of alumina and the approximate crystalline configuration as determined by X-ray diffraction of a cube 8.2 A. on edge.

11. Alumina prepared by calcining at a temperature of at least 1400° F. an alumina hydrate having about 1.2 to 2.6 moles of water of hydration per mole of alumina and the approximate crystalline configuration as determined by X-ray diffraction of a cube 8.2 A. on edge.

References Cited by the Examiner

UNITED STATES PATENTS

| | | | |
|---|---|---|---|
| 1,929,942 | 10/1933 | Barclay | 23—143 |
| 1,953,201 | 4/1934 | Tosterud | 23—143 |
| 2,528,751 | 11/1950 | Hunter | 23—143 |
| 2,659,660 | 11/1953 | Sable | 23—143 |
| 2,881,051 | 4/1959 | Pingard | 23—143 |
| 3,024,088 | 3/1962 | Palmquist et al. | 23—143 |

OTHER REFERENCES

Russell: "Alumina Properties," Technical Paper No. 10, Aluminum Co. of America, Pittsburgh, Pa., 1953, 35 pages (pages 22, 26, 27 and 30 of particular interest).

OSCAR R. VERTIZ, *Primary Examiner.*

BENJAMIN HENKIN, *Examiner.*

H. T. CARTER, *Assistant Examiner.*